(12) United States Patent
Kato et al.

(10) Patent No.: US 7,955,213 B2
(45) Date of Patent: Jun. 7, 2011

(54) AUTOMATIC TRANSMISSION

(75) Inventors: Takaaki Kato, Anjo (JP); Tsuyoshi Fukaya, Kariya (JP); Akihito Hongoya, Okazaki (JP); Hiroyuki Tsukamoto, Chiryu (JP); Masafumi Kinoshita, Toyota (JP); Masaru Morise, Nukata-gun (JP)

(73) Assignees: Aisin AW Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 363 days.

(21) Appl. No.: 12/293,737

(22) PCT Filed: Mar. 29, 2007

(86) PCT No.: PCT/JP2007/056794
§ 371 (c)(1),
(2), (4) Date: Sep. 19, 2008

(87) PCT Pub. No.: WO2007/114215
PCT Pub. Date: Nov. 10, 2007

(65) Prior Publication Data
US 2010/0167866 A1    Jul. 1, 2010

(30) Foreign Application Priority Data

Mar. 29, 2006  (JP) ................................ 2006-092488
Apr. 10, 2006  (JP) ................................ 2006-107856

(51) Int. Cl.
*F16H 3/62* (2006.01)
(52) U.S. Cl. ....................................................... 475/275
(58) Field of Classification Search .................... None
See application file for complete search history.

(56) References Cited

U.S. PATENT DOCUMENTS

| | | | |
|---|---|---|---|
| 4,660,439 A | | 4/1987 | Hiraiwa |
| 4,711,138 A | | 12/1987 | Miura et al. |
| 5,518,465 A | * | 5/1996 | Hiraiwa ................. 475/275 |
| 6,752,738 B1 | * | 6/2004 | Martin et al. ............ 475/276 |
| 2001/0034284 A1 | | 10/2001 | Sugiura et al. |
| 2010/0234164 A1 | * | 9/2010 | Kato et al. .............. 475/271 |

FOREIGN PATENT DOCUMENTS

| | | |
|---|---|---|
| JP | 60-065943 A | 4/1985 |
| JP | 07-094856 B2 | 10/1995 |
| JP | 2000-046129 A | 2/2000 |
| JP | 2001-263438 A | 9/2001 |
| JP | 2002-213545 A | 7/2002 |

* cited by examiner

*Primary Examiner* — Dirk Wright
(74) *Attorney, Agent, or Firm* — Sughrue Mion, PLLC

(57) ABSTRACT

An automatic transmission in which first to third clutches which can couple an input shaft to a first element of a first multiple planetary gear set and second and fourth elements of the second multiple planetary gear set, respectively, are arranged on a front side of the first multiple planetary gear set. Thus, it is possible to prevent a situation in which disengaging of the third clutch in the first speed causes the fourth element of the first multiple planetary gear set to rotate in reverse and generate a large relative rotation with the first element.

10 Claims, 11 Drawing Sheets

FIG. 2

| | C-1 | C-2 | C-3 | B-1 | B-2 | B-3 | B-4 | F-1 |
|---|---|---|---|---|---|---|---|---|
| 1st | ○ | | | ● | | | (○) | ○ |
| 2nd | ○ | | | ● | ○ | | | |
| 3rd | ○ | | ○ | ○ | | | | |
| 4th | ○ | | ○ | | | | | |
| 5th | ○ | ○ | ● | | | ○ | | |
| 6th | | ○ | ○ | | | ○ | | |
| 7th | | ○ | ○ | ○ | | | | |
| 8th | | ○ | | ● | ○ | | | |
| Rev1 | | | ○ | ○ | | ○ | ○ | |
| Rev2 | | | ○ | | | ○ | ○ | |

AUTOMATIC TRANSMISSION

The disclosure of PCT Application No. PCT/JP2007/056794 filed on Mar. 29, 2007 including the specification, drawings and abstract is incorporated herein by reference in its entirety.

BACKGROUND OF THE INVENTION

1. Field of the Invention

The present invention relates to an automatic transmission in which respective elements of first and second multiple planetary gear sets can be coupled to an input shaft via a clutch and can be fixed via a brake, so as to shift rotation of the input shaft with plural speeds and transfer the rotation to an output shaft.

2. Description of the Related Art

In Japanese Patent Application Publication No. JP-A-2002-213545 (p. 8, FIG. 4), there is described an automatic transmission, in which an input shaft, a first multiple planetary gear set, a second multiple planetary gear set, and an output shaft are arranged on a common axis in a transmission case, and respective elements of first and second multiple planetary gear sets are coupled to the input shaft selectively via a clutch and fixed selectively via a brake, thereby shifting rotation of the input shaft with eight forward speeds and a reverse speed and transferring the rotation to the output shaft. Then in the automatic transmission shown in FIG. 4 of Japanese Patent Application Publication No. JP-A-2002-213545, the first multiple planetary gear set 60 is structured including a common sun gear S1S2 coupled to an input shaft 15, a common carrier C1C2 which supports a long pinion 63 meshing with the common sun gear S1S2 and a pinion 64 meshing with the long pinion 63 and can be fixed via a second brake B-2, a first ring gear R1 which meshes with the long pinion 63 and can be fixed via a first brake B-1, and a second ring gear R2 which meshes with the pinion 64 and can be fixed via a third brake B-3. The second multiple planetary gear set 17 is structured including directly coupled third and fourth sun gears S3, S4 which can be coupled to the input shaft 15 via a first clutch C-1, third and fourth ring gears R3, R4 which mesh with the third and fourth sun gears S3, S4 via pinions 33, 34 and can be fixed respectively via the third and fourth brakes B-3, B-4, a third carrier C-3 which supports the pinion 33 and can be coupled to the input shaft 15 via a second clutch C-2, and a fourth carrier C-4 supporting the pinion 34 and coupled to an output shaft 18.

In FIG. 4 of Japanese Patent Application Publication No. JP-A-2002-213545, the first and second clutches are arranged inside a coupling portion of the common ring gear R2 of the first multiple planetary gear set and the third ring gear R3 of the second multiple planetary gear set. However, providing two clutches inside a rotating member results in a complicated structure and causes a problem of increase in size.

Further, in paragraphs [0040] [0041] of Japanese Patent Application Publication No. JP-A-2002-213545, it is also described that a large relative rotation difference occurs between the ring gears and the sun gear of the first multiple planetary gear in the first forward speed and results in fast autorotation of the pinions meshing with the both, and accordingly, to prevent this autorotation, a new clutch can be interposed between the common sun gear and the input shaft so as to allow selective coupling. However, when the new clutch is interposed between the common sun gear and the input shaft in FIG. 4 of Japanese Patent Application Publication No. JP-A-2002-213545, the size of the automatic transmission in a radial direction becomes quite large.

SUMMARY OF THE INVENTION

An aspect of the present invention is to provide an automatic transmission with eight forward speeds that is compact, in which first to third clutches selectively coupling an input shaft to first and second multiple planetary gear sets are arranged on a front side of the first multiple planetary gear set, and thereby relative rotation of sun gears and ring gears of the first multiple planetary gear set can be suppressed small.

According to a first aspect of the present invention, a first element of the first multiple planetary gear set can be coupled to the input shaft via the third clutch, and thus it is possible to prevent that disengaging the third clutch in the first speed causes the fourth element of the first multiple planetary gear set to rotate in reverse and generate a large relative rotation with the first element. Further, first to third clutches, which can couple the input shaft to the first element of the first multiple planetary gear set, and to the second, fourth elements of the second multiple planetary gear set respectively, are arranged together on the front side of the first multiple planetary gear set, and thus an automatic transmission with eight forward speed can be structured very compactly and light-weighted at lower costs.

Then, the first multiple planetary gear set is structured including the second sun gear as the first element, the common ring gear as the second element meshing with the second sun gear via the long pinion and the pinion supported rotatably by the common carrier and meshing with each other, the common carrier as the third element, and the first sun gear as the fourth element meshing with the common ring gear via the long pinion or the pinion, and thus the automatic transmission with eight forward speeds which is compact and has a simple structure can be provided.

Further, the first to third clutches arranged together on the front side, the first multiple planetary gear set, and the second multiple planetary gear set are arranged in this order in an axial direction, and the third brake and the first sun gear are arranged on the side of the first to third clutches. Thus, the third brake which can fix the first sun gear that is the fourth element of the first multiple planetary gear set can be arranged compactly between the first to third clutches and the first multiple planetary gear set.

According to a second aspect of the present invention, the first element of the first multiple planetary gear set can be coupled to the input shaft via the third clutch, and thus it is possible to prevent that disengaging the third clutch in the first speed causes the fourth element of the first multiple planetary gear set to rotate in reverse and generate a large relative rotation with the first element. Further, the first to third clutches, which can couple the input shaft to the first element of the first multiple planetary gear set, and to the second, fourth elements of the second multiple planetary gear set respectively, are arranged together on the front side of the first multiple planetary gear set, and thus the automatic transmission with eight forward speed can be structured very compactly and light-weighted at lower costs.

Then the first multiple planetary gear set is structured including the common sun gear as the first element, the second ring gear as the second element meshing via the pinion with the long pinion supported rotatably by the common carrier, the common carrier as the third element, and the first ring gear as the fourth element meshing with the common sun gear via the long pinion, and thus the automatic transmission with eight forward speeds which is compact and has a simple structure can be provided.

Further, the first to third clutches arranged together on the front side, the first multiple planetary gear set, and the second multiple planetary gear set are arranged in this order in an axial direction, and a first brake is arranged on the side of the first to third clutches. Thus, the first brake which can fix the common carrier that is the third element of the first multiple planetary gear set can be arranged compactly between the first to third clutches and the first multiple planetary gear set.

According to a third aspect of the present invention, a common clutch drum is used in common by the second clutch and the third clutch, and thus the structures of friction engagement portions and hydraulic servo portions of the second clutch and the third clutch can be simplified and made compact.

According to a fourth aspect of the present invention, the first clutch is arranged inside the second and third clutches, and thus the first to third clutches can be arranged in a small space, and the automatic transmission of the eight forward speeds can be made compact and light-weighted at lower costs.

According to a fifth aspect of the present invention, hydraulic servo units of the second and third clutches are provided in the common clutch drum respectively on the rear face side and the front face side of the bottom wall thereof, and thus the hydraulic servo units of the second and third clutches can be arranged in a small space.

According to a sixth aspect of the present invention, the servo chambers of the hydraulic servo units of the second, third clutches are partitioned on the rear face side and the front face side of the bottom wall of the common clutch drum by the rear side portion and the front side portion of the base end portion of the common clutch drum and the pistons engaging slidably with the inner peripheral surface and the outer peripheral surface of the bending portion of the bottom wall respectively, and the oil passages opening in the servo chambers are provided in the base end portion. Thus, the hydraulic servo units of the second and third clutches can be structured simply and compactly, and the oil passages supplying/discharging oil pressure into/from the respective servo chambers can be provided easily.

According to a seventh aspect of the present invention, the base end portion of the common clutch drum is supported rotatably by the boss portion of the front wall member fixed to the transmission case, and the oil passages opening in the servo chambers of the second, third clutches are communicated respectively with the oil passages provided in the boss portion via the distributor. Thus, the structures of the second, third clutches can be simplified, and the oil passages supplying/discharging oil pressure into/from the respective servo chambers can be provided easily.

According to an eighth aspect of the present invention, the second multiple planetary gear set is structured including the directly coupled third and fourth sun gears, the third and fourth carriers rotatably supporting the third and fourth pinions respectively, the third ring gear meshing with the third sun gear via the third pinion, and the fourth ring gear meshing with the fourth sun gear via the fourth pinion and coupled directly to the third sun gear. Thus, the automatic transmission having gear ratios of eight forward speeds and at least one reverse speed with a simple structure can be provided.

BRIEF DESCRIPTION OF THE DRAWINGS

FIG. 2 shows an operation table of brakes and clutches with respective shift speeds of the first embodiment.

DETAILED DESCRIPTION OF THE NON-LIMITING EMBODIMENTS OF THE INVENTION

Figure 1:
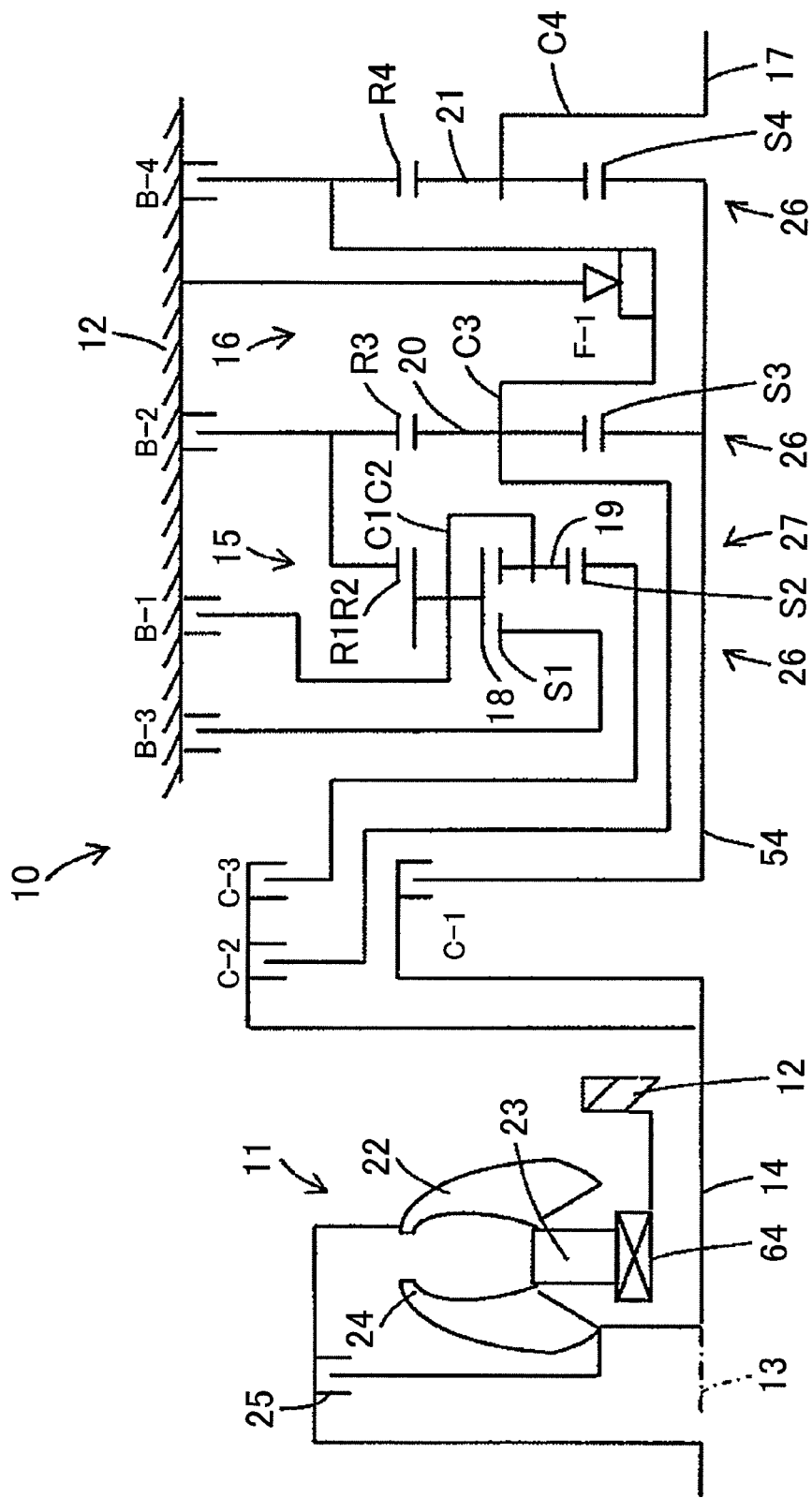
FIG. 1 is a skeleton diagram showing a first embodiment of an automatic transmission according to the present invention.

Hereinafter, a first non-limiting embodiment of an automatic transmission according to the present invention will be explained based on the drawings. In FIG. 1, reference numeral 10 denotes the automatic transmission according to the present invention, which is used for shifting output rotation of a hydraulic torque converter 11 rotary driven by an engine of a vehicle for example and transfer the rotation to driving wheels. The automatic transmission 10 is structured including an input shaft 14, a first multiple planetary gear set 15, a second multiple planetary gear set 16, an output shaft 17, first, second, third clutches C-1, C-2, C-3 and first, second, third, fourth brakes B-1, B-2, B-3, B-4, a one way clutch F-1, and so on, which are supported on a common axis 13 sequentially inside a transmission case 12 assembled on a vehicle body.

The first multiple planetary gear set 15 is structured including first and second sun gears S1, S2 supported rotatably on the common axis 13 respectively, a common carrier C1C2 rotatably supporting a long pinion 18 and a pinion 19 meshing with each other, a common ring gear R1R2 meshing with the first sun gear S1 via the long pinion 18 and meshing with the second sun gear S2 via the long pinion 18 and the pinion 19.

The second multiple planetary gear set 16 is structured including third, fourth sun gears S3, S4 supported rotatably on the common axis 13 and coupled directly to each other, third and fourth carriers C3C4 supporting third, fourth pinions 20, 21, and third, fourth ring gears R3, R4 meshing with the third, fourth sun gears S3, S4 respectively via the third, fourth pinions 20, 21. To be coupled directly means to be coupled directly without intervention of a clutch.

In the first multiple planetary gear set 15, the first sun gear S1 can be fixed via the third brake B-3, the second sun gear S2 can be coupled directly to the input shaft 14 via the third clutch C-3, the common carrier C1C2 can be fixed via the first brake B-1, and the common ring gear R1R2 is coupled directly to the third ring gear R3 of the second multiple planetary gear set 16.

In the second multiple planetary gear set 16, the directly coupled third, fourth sun gears S3, S4 can be coupled to the input shaft 14 via the first clutch C-1, the directly coupled third carrier C3 and fourth ring gear R4 can be coupled to the input shaft 14 via the second clutch C-2 and can be fixed via the fourth brake B-4, and coupled to the case 12 via the one-way clutch F-1 arranged in parallel to the fourth brake B-4 to be prevented from rotating in reverse, the third ring gear R3 can be fixed via the second brake B-2, and the fourth carrier C-4 is coupled directly to the output shaft 17.

In addition, a pump impeller 22 of the hydraulic torque converter 11 is rotary driven by the not-shown engine to send out oil, and a stator 23 receives reaction force of the oil to generate torque in a turbine 24. The input shaft 14 is coupled directly to the turbine 24. Reference numeral 25 denotes a lock-up clutch that enables coupling of the pump impeller 22 and the turbine 24.

The automatic transmission 10 structured as above can realize shift speeds of eight forward speeds and two reverse speeds by selectively engaging the first to third clutches C-1 to C-3, selectively engaging the first to fourth brakes B-1 to B-4, and selectively coupling or fixing elements of the input shaft 14, the output shaft 17, the first multiple planetary gear set 15 and the second multiple planetary gear set 16. In the operation table of FIG. 2, a white circle added to fields corresponding to the respective shift speeds of the first to third clutches C-1 to C-3, the first to fourth brakes B-1 to B-4 and the one way clutch F-1 indicates an engaged and coupled state in the case of a clutch, or an engaged and fixed state in the case of a brake. A black circle added thereto indicates a state that oil pressure is supplied to a hydraulic servo in preparation for shifting so that the shifting is performed smoothly, but torque is not transferred in the case of a clutch, or supporting by reaction force is not performed in the case of a brake.

For a single-pinion planetary gear 26 of the first and second multiple planetary gear sets 15, 16, a relationship of the number of rotations Ns of the sun gear, the number of rotations Nc of the carrier, the number of rotations Nr of the ring gear with the gear ratio λ of the single-pinion planetary gear is represented by Equation (1), and for a double-pinion planetary gear 27, a relationship of the number of rotations Ns of the sun gear, the number of rotations Nc of the carrier, the number of rotations Nr of the ring gear with the gear ratio λ, of the double-pinion planetary gear is represented by Equation (2). The gear ratio in each shift speed is calculated based on Equations (1), (2). When the numbers of teeth of the first to fourth sun gears S1, S2, S3, S4 are Zs1, Zs2, Zs3, Zs4, and the numbers of teeth of the common ring gears R1R2 and the third and fourth ring gears R3, R4 are Zr12, Zr3, Zr4, the gear ratios of the single-pinion planetary gear 26, the double-pinion planetary gear 27 are λ1=Zs1/Zr12, λ2=Zs2/Zr12, λ3=Zs3/Zr3, λ4=Zs4/Zr4.

$$Nr=(1+\lambda)Nc-\lambda Ns \quad (1)$$

$$Nr=(1-\lambda)Nc+\lambda Ns \quad (2)$$

Figure 3:
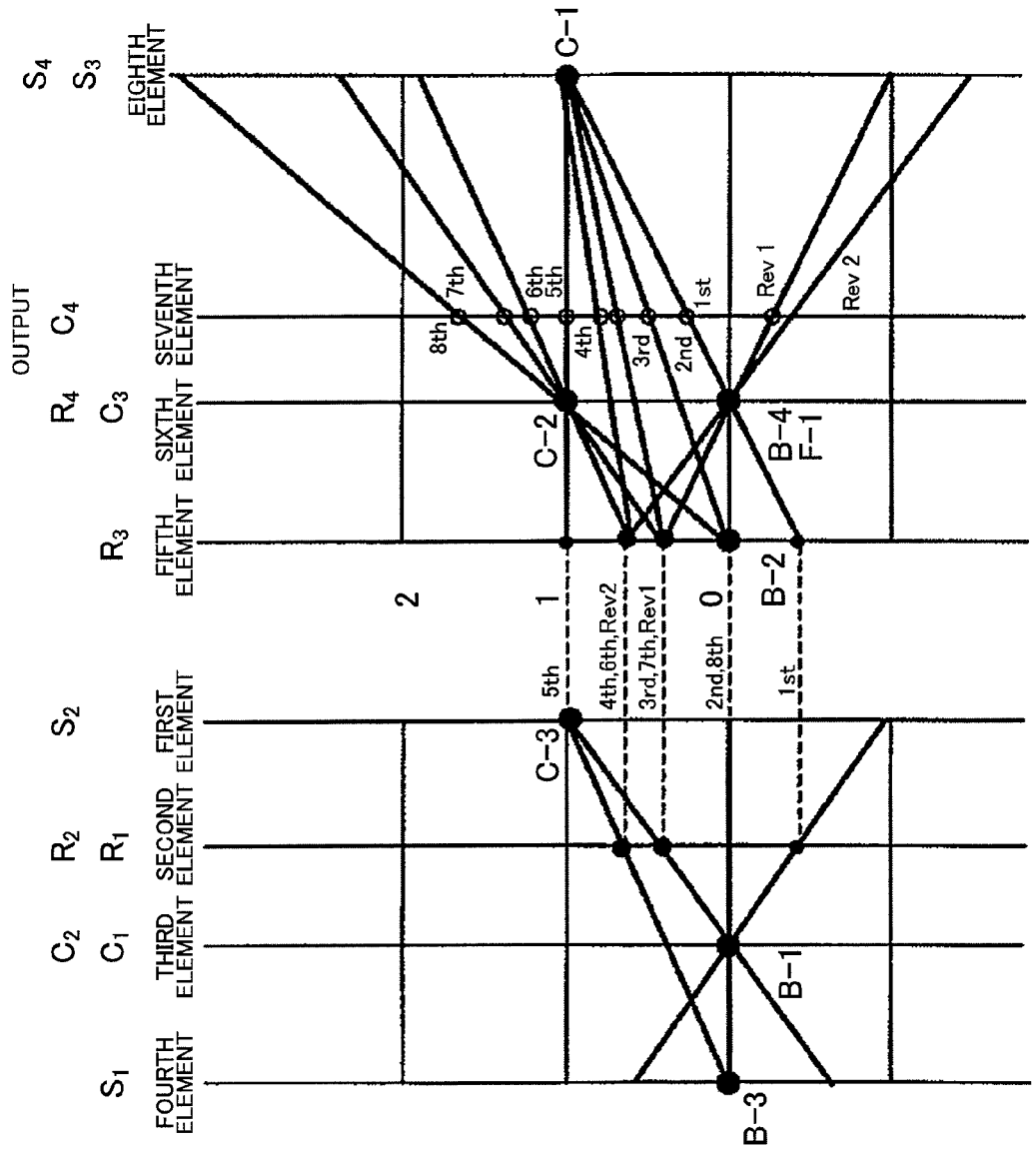
FIG. 3 is a speed diagram showing rotation ratios of respective elements of planetary gear sets with the respective shift speeds of the first embodiment.

When the first to third clutches C-1 to C-3 are engaged selectively, and the first to fourth brakes B-1 to B-4 are engaged selectively, the speed ratios of the respective elements of the first and second multiple planetary gear sets 15, 16 are as represented by speed diagrams shown in FIG. 3. In the speed diagrams, respective elements constituted of the sun gears, the carriers, the ring gears of the planetary gear sets are arranged in the horizontal axis direction at intervals corresponding to the gear ratios, and the speed ratios thereof are taken on the vertical axis direction corresponding to the respective elements. In FIG. 3, speed diagrams of the first and second multiple planetary gear sets 15, 16 are arranged on left and right. In the first multiple planetary gear set 15, since the first carrier C1 and the second carrier C2, the first ring gear R1 and the second ring gear R2 of the single-pinion planetary gear 26 and the double-pinion planetary gear 27 are used in common respectively, speed ratios of the common carrier C1C2 and the common ring gear R1R2 are represented on respective vertical lines to which C1, C2 and R1, R2 are added respectively. In the second multiple planetary gear set 16, since the third and fourth sun gears S3, S4 of the single-pinion planetary gear 26 are coupled directly, and the third carrier C3 and the fourth ring gear R4 are coupled directly, speed ratios of the third and fourth sun gears S3, S4, the third carrier C3 and the fourth ring gear R4 are represented on respective vertical lines to which S1, S2 and C3, R4 are added respectively.

For the single-pinion planetary gear 26 of the first multiple planetary gear set 15, an interval between the vertical line of the common carrier C1C2 and the vertical line of the first sun gear S1 is assumed as 1, and the vertical line of the common ring gear R1R2 is arranged separated from the vertical line of the common carrier C1C2 by an interval λ1 on the opposite side of the vertical line of the sun gear S1. For the double-pinion planetary gear 27, an interval between the vertical line of the common carrier C1C2 and the vertical line of the second sun gear S2 is assumed as 1, and the vertical line of the common ring gear R1R2 is arranged separated from the vertical line of the common carrier C1C2 by a gear ratio λ2 on the same side as the vertical line of the second sun gear S2. For the single-pinion planetary gear 26 of the second multiple planetary gear set 16, intervals between the vertical lines of the third and fourth carriers C3, C4 and the vertical line of the third and fourth sun gears S3, S4 are each assumed as 1, and the vertical lines of the third and fourth ring gears R3, R4 are arranged separated from the vertical lines of the third and fourth carriers C3, C4 on the opposite side of the vertical line of the third and fourth sun gears S3, S4 by intervals λ3, λ4, respectively. On the speed diagrams, C-1 to C-3, B-1 to B-4, F-1 are written at the points where the first to third clutches C-1 to C-3, the first to fourth brakes B-1 to B-4 and the one way clutch F-1 are operated selectively.

On the speed diagram of the first multiple planetary gear set 15 created as such, elements corresponding to the four respective vertical lines are the first, second, third, fourth elements in the order of this arrangement from the right side of the vertical lines, and on the speed diagram of the second multiple planetary gear set 16, elements corresponding to the four respective vertical lines are the fifth, sixth, seventh, eighth elements in the order of arrangement from the left side of the vertical lines. In the case of the first embodiment, the second sun gear S2 of the first multiple planetary gear set 15 is the first element, the common ring gear R1R2 is the second element, the common carrier C1C2 is the third element, the first sun gear S1 is the fourth element. The third ring gear R3 of the second multiple planetary gear set 16 is the fifth element, the third carrier C3 and the fourth ring gear R4 are the sixth element, the fourth carrier C4 is the seventh element, and the third and fourth sun gears S3, S4 are the eighth element.

A control unit for the automatic transmission 10 will be explained based on the block diagram shown in FIG. 4. The control unit 30 including a CPU, to which detection signals are inputted from an engine speed sensor 31 detecting the number of rotations Ne on the engine side of the torque converter 11 to which the rotation of the engine is transferred, an input speed sensor 32 detecting the number of rotations Ni of the input shaft 14, an output speed sensor 33 detecting the number of rotations Nv of the output shaft 17, a range position sensor 34 transmitting a detection signal D, N, R when the shift lever is shifted to a drive range D, neutral range N, reverse range R, a throttle opening degree sensor 35 detecting the amount Ss of pressing down the accelerator, and/or the like, selects an optimum shift speed based on these detection signals, and outputs a control current to hydraulic servo units 86, 93, 100, 122, 133, 151, 159 which operate the respective clutches and brakes, so as to selectively engage the first to third clutches C-1 to C-3, the first to fourth brakes B-1 to B-4 as shown in the operation table of FIG. 2, thereby achieving the eight forward speeds and two reverse speeds.

The first (1st) speed is achieved by engagement of the first clutch C-1 by the control unit 30 and automatic engagement of the one way clutch F-1. The rotation of the input shaft 14 is inputted to the third and fourth sun gears S3, S4 of the second multiple planetary gear set 16 via the first clutch C-1, and the third carrier C3 and the fourth ring gear R4 are blocked not to rotate in reverse by the one way clutch F-1 and receive reaction force. Thus, the fourth carrier C4 and further the output shaft 17 are rotated in a regular direction while being decelerated by the gear ratio of the first speed.

When engine braking is applied on a downhill road, the number of rotations transferred from the driving wheels to the third carrier C3 and the fourth ring gear R4 via the fourth carrier C4 becomes larger than the number of rotations transferred from the engine side, and the direction of the reaction force operating on the third carrier C3 and the fourth ring gear R4 is inverted. Accordingly, when applying engine braking, as shown by (O) in FIG. 2, the third carrier C3 and the fourth ring gear R4 are fixed by engagement of the fourth brake B-4.

The second speed (2nd) is achieved by engagement of the first clutch C-1 and the second brake B-2. The rotation of the input shaft 14 is inputted to the third and fourth sun gears S3, S4 of the second multiple planetary gear set 16 via the first clutch C-1, and the third ring gear R3 is fixed via the second brake B-2. Thus, the fourth carrier C4 and further the output shaft 17 are rotated in the regular direction while being decelerated by the gear ratio of the second speed.

The third speed (3rd) is achieved by engagement of the first, third clutches C-1, C-3 and the first brake B-1. The rotation of the input shaft 14 is inputted to the second sun gear S2 of the first multiple planetary gear set 15 via the third clutch C-3, and the common carrier C1C2 is fixed via the first brake B-1. Thus, the rotation of the common ring gear R1R2 decelerating the rotation of the input shaft 14 is transferred to the third ring gear R3 of the multiple planetary gear set 16 coupled directly to the common ring gear R1R2, and the rotation of the input shaft 14 is inputted to the third and fourth sun gears S3, S4 of the multiple planetary gear set 16 via the first clutch C-1, thereby rotating the fourth carrier C4 and further the output shaft 17 in the regular direction while being decelerated by the gear ratio of the third speed.

The fourth speed (4th) is achieved by engagement of the first, third clutches C-1, C-3 and the third brake B-3. The rotation of the input shaft 14 is inputted to the second sun gear S2 of the first multiple planetary gear set 15 via the third clutch C-3, and the first sun gear S1 is fixed via the third brake B-3. Thus, the rotation of the common ring gear R1R2 decelerating the rotation of the input shaft 14 is transferred to the third ring gear R3 of the multiple planetary gear set 16 coupled directly to the common ring gear R1R2, and the rotation of the input shaft 14 is inputted to the third and fourth sun gears S3, S4 of the multiple planetary gear set 16 via the first clutch C-1, thereby rotating the fourth carrier C4 and further the output shaft 17 in the regular direction while being decelerated by the gear ratio of the fourth speed.

The fifth speed (5th) is achieved by engagement of the first and second clutches C-1, C-2. The rotation of the input shaft 14 is inputted to the directly coupled third and fourth sun gears S3, S4 and the directly coupled third carrier C3 and fourth ring gear R4 of the second multiple planetary gear set 16 via the first and second clutches C-1, C-2, the second multiple planetary gear set 16 is rotated integrally, and the fourth carrier C4 and further the output shaft 17 are rotated in the regular direction by the same number of rotations as the input shaft 14 by the gear ratio of the fifth speed.

The sixth speed (6th) is achieved by engagement of the second, third clutches C-2, C-3 and the third brake B-3. The rotation of the input shaft 14 is inputted to the second sun gear S2 of the first multiple planetary gear set 15 via the third clutch C-3, and the first sun gear S1 is fixed via the third brake B-3. Thus, the rotation of the common ring gear R1R2 decelerating the rotation of the input shaft 14 is transferred to the third ring gear R3 of the second multiple planetary gear set 16 coupled directly to the common ring gear R1R2, and the directly coupled third carrier C3 and fourth ring gear R4 are coupled to the input shaft 14 via the second clutch C-2, thereby rotating the fourth carrier C4 and further the output shaft 17 in the regular direction while being accelerated by the gear ratio of the sixth speed.

The seventh speed (7th) is achieved by engagement of the second, third clutches C-2, C-3 and the first brake B-1. The rotation of the input shaft 14 is inputted to the second sun gear S2 of the first multiple planetary gear set 15 via the third clutch C-3, and the common carrier C1C2 is fixed via the first brake B-1. Thus, the rotation of the common ring gear R1R2 decelerating the rotation of the input shaft 14 is transferred to the third ring gear R3 of the second multiple planetary gear set 16 coupled directly to the common ring gear R1R2, and the directly coupled third carrier C3 and fourth ring gear R4 are coupled to the input shaft 14 via the second clutch C-2, thereby rotating the fourth carrier C4 and further the output shaft 17 in the regular direction while being accelerated by the gear ratio of the seventh speed.

The eighth speed (8th) is achieved by engagement of the second clutch C-2 and the second brake B-2. The rotation of the input shaft 14 is inputted to the directly coupled third carrier C3 and fourth ring gear R4 of the second multiple planetary gear set 16 via the second clutch C-2, and the third ring gear R3 is fixed by the second brake B-2, thereby rotating the fourth carrier C4 and further the output shaft 17 in the regular direction while being accelerated by the gear ratio of the eighth speed.

The first reverse speed (Rev1) is achieved by engagement of the third clutch C-3 and the first, fourth brakes B-1, B-4. The rotation of the input shaft 14 is inputted to the second sun gear S2 of the first multiple planetary gear set 15 via the third clutch C-3, and the common carrier C1C2 is fixed via the first brake B-1. Thus, the rotation of the common ring gear R1R2 decelerating the rotation of the input shaft 14 is transferred to the third ring gear R3 of the second multiple planetary gear set 16 coupled directly to the common ring gear R1R2, and the directly coupled third carrier C3 and fourth ring gear R4 are fixed via the fourth brake B-4, thereby rotating the fourth carrier C4 and further the output shaft 17 in a reverse direction while being decelerated by the gear ratio of the first reverse speed.

The second reverse speed (Rev2) is achieved by engagement of the third clutch C-3 and the third, fourth brakes B-1, B-4. The rotation of the input shaft 14 is inputted to the second sun gear S2 of the first multiple planetary gear set 15 via the third clutch C-3, and the common carrier C1C2 is fixed via the third brake B-1. Thus, the rotation of the common ring gear R1R2 decelerating the rotation of the input shaft 14 is transferred to the third ring gear R3 of the second multiple planetary gear set 16 coupled directly to the common ring gear R1R2, and the directly coupled third carrier C3 and fourth ring gear R4 are fixed via the fourth brake B-4, thereby rotating the fourth carrier C4 and further the output shaft 17 in the reverse direction while being decelerated by the gear ratio of the second reverse speed.

With the respective gear ratios $\lambda 1$, $\lambda 2$, $\lambda 3$, $\lambda 4$ (the number of teeth of the sun gear/the number of teeth of the ring gear) of the single-pinion planetary gear 26 and the double-pinion planetary gear 27 of the first and second multiple planetary gear sets 15, 16 being set to 0.520, 0.440, 0.394, 0.394 for example, calculation of the gear ratios with the respective shift speeds based on Equations (1), (2) results in that rotation ratios of the input shaft 14 to the output shaft 17 with the respective shift speeds, namely gear ratios, become appropriate values, 3.538 for the first speed, 2.060 for the second speed, 1.405 for the third speed, 1.185 for the fourth speed, 1.000 for the fifth speed, 0.821 for the sixth speed, 0.713 for the seventh speed, 0.582 for the eighth speed, 3.168 for the first reverse speed, 2.001 for the second reverse speed. Then, the steps between the respective gear ratios are 1.717 between the first, second speeds, 1.467 between the second, third speeds, 1.186 between the third, fourth speeds, 1.185 between the fourth, fifth speeds, 1.218 between the fifth, sixth speeds, 1.151 between the sixth, seventh speeds, 1.225 between the seventh, eighth speeds, and the gear ratios decrease with appropriate ratios in the respective shift speeds. With the automatic transmission according to this embodiment, the gear ratios of eight forward speeds and two reverse speeds which are separated appropriately can be obtained.

Figure 5:
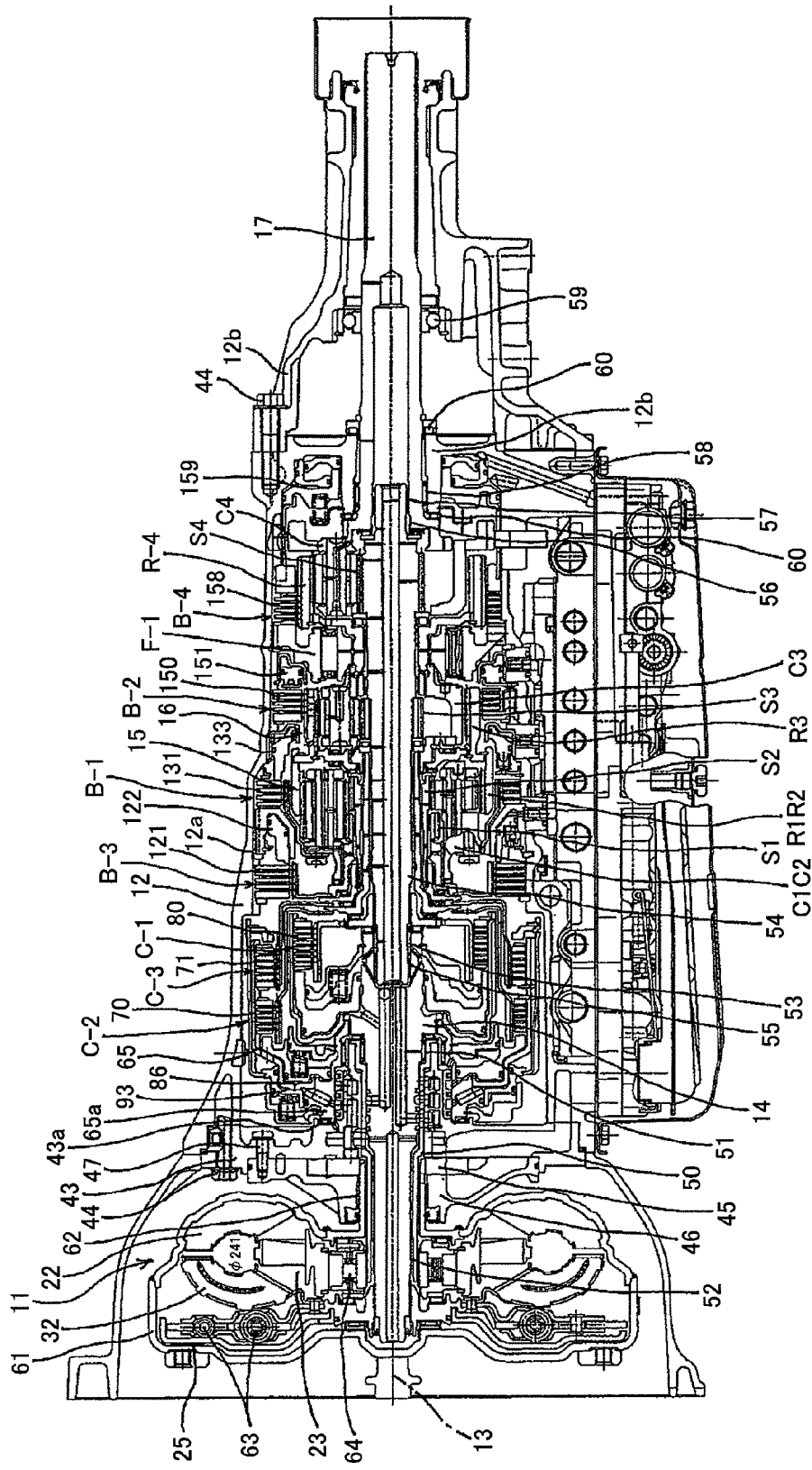
FIG. 5 is a cross-sectional view showing a specific overall structure of the automatic transmission.
Figure 6:
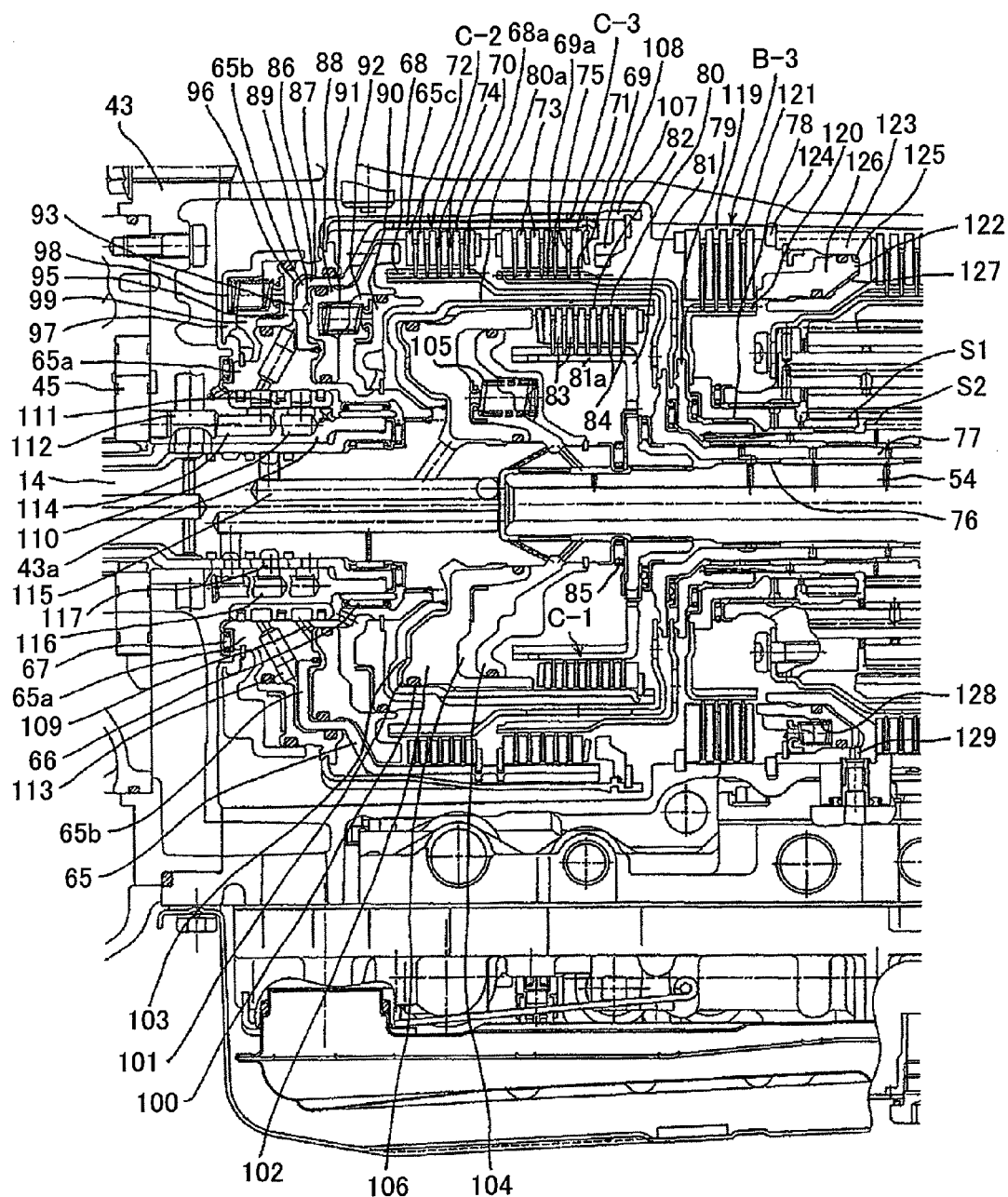
FIG. 6 is an enlarged cross-sectional view showing first to third clutch portions of FIG. 5.
Figure 7:
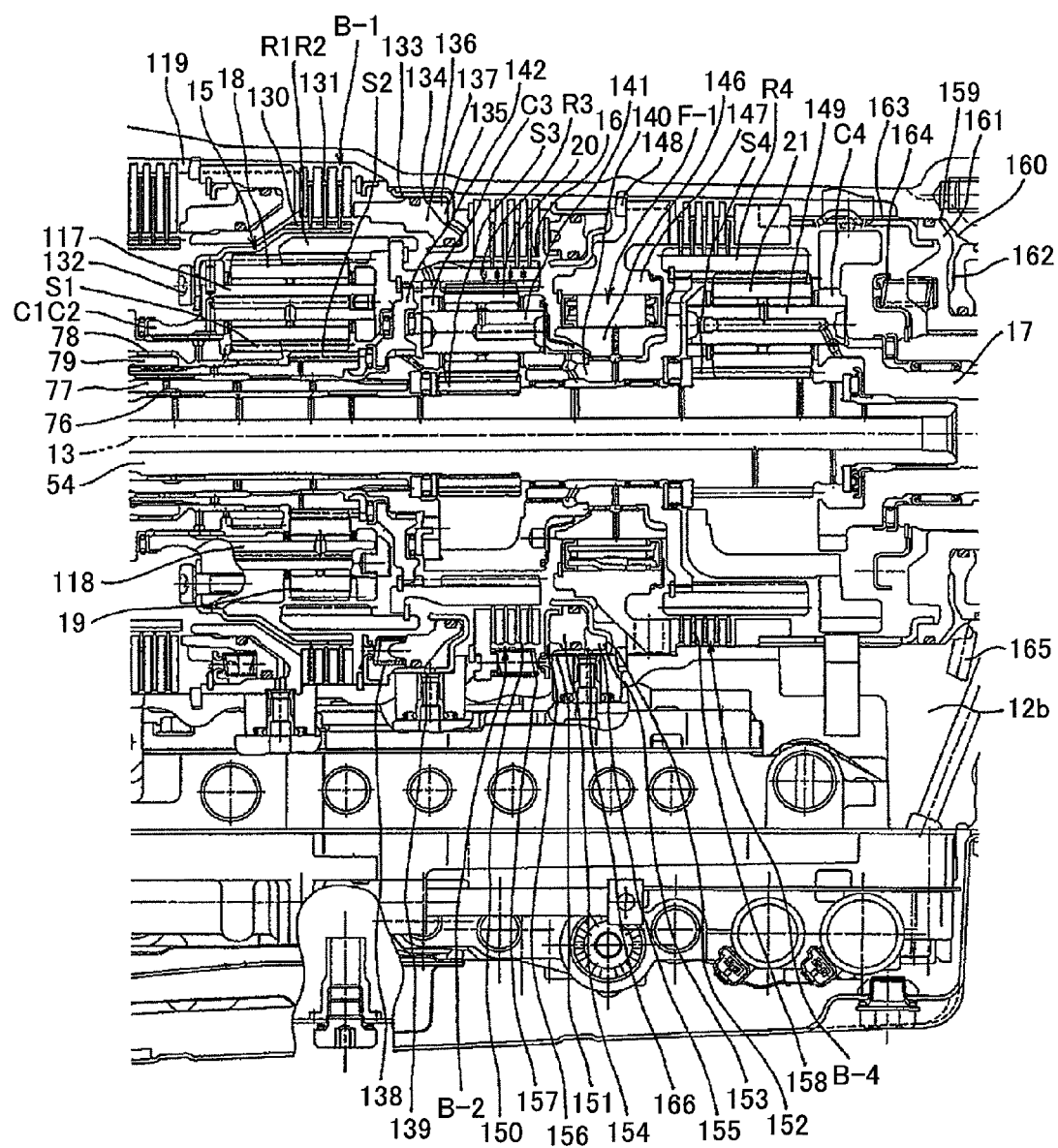
FIG. 7 is an enlarged cross-sectional view showing first and second multiple planetary gear portions of FIG. 5.

Hereinafter, a concrete structure of the first embodiment will be explained with FIG. 4 to FIG. 6. The transmission case 12 has a transmission case body 12a in a cylindrical shape with a bottom, and a rear case 12b fixed to a bottom portion thereof by bolts 44, and a front wall member 43 is fixed by bolts 44 to a front end face of the transmission case body 12a. On a front end face of the front wall member 43, an oil pump body 46 accommodating an oil pump 45 is fixed by bolts 47, and a rear side of the oil pump 45 is blocked by the front wall member 43. The front wall member 43 has a boss portion 43a extending rearward from an inner peripheral portion thereof, and a stator shaft 50 is press-fitted onto an inner peripheral surface of the boss portion 43. The input shaft 14 is supported pivotally about the common axis 13 on the stator shaft 50 by a needle bearing 51 and a metal bearing 52.

A shaft support hole 53 is provided on a rear end portion of the input shaft 14, and a tip portion of an intermediate shaft 54 is coaxially supported so as to pivot relatively in the shaft support hole 53 by a metal bearing 55. A rear end portion of the intermediate shaft 54 is supported pivotally in a support hole 56 provided in a front end portion of the output shaft 17 by a metal bearing 57. The output shaft 17 is supported pivotally on a bottom wall 12b and the rear case 12b of the transmission case body 12a by a needle bearing 58, a ball bearing 59, and a thrust bearing 60.

On the oil pump body 46, a hollow rotor 61 coupled to a not-shown engine output shaft and provided with the pump impeller 22 of the hydraulic torque converter 11 inside is supported rotatably by a metal bearing 62. A turbine 24 facing the pump impeller 22 is engaged with a tip portion of the input shaft 14, and is restricted not to rotate relatively. Between the rotor 61 and the turbine 24, the lock-up clutch 25 coupling them mechanically via a spring dumper 63 is provided. The stator 23 is supported on the stator shaft 50 via a one-way clutch 64. Here, in the automatic transmission 10, the side of the hydraulic torque converter 11 is called the front side, and the side of the output shaft 17 is called the rear side.

On the front side portion of the transmission case 12, the first to third clutches C-1, C-2, C-3 are arranged together on the front side of the first multiple planetary gear set 15. On the boss portion 43a of the front wall member 43, a base end portion 65a of a common clutch drum 65 used in common by the second, third clutches C-2, C-3 is supported rotatably by a needle bearing 66 and a thrust bearing 67. The common clutch drum 65 spline-engages with an outer peripheral surface of the input shaft 14 on an inner peripheral surface of a base end cylindrical portion projecting rearward from the base end portion 65a, and rotary coupled to the input shaft 14. The common clutch drum 65 has a bottom wall 65b extending from the base end portion 65a in a radial direction, and a cylindrical portion 65c extending rearward from an outer periphery of the bottom wall 65b. On an inner periphery of the cylindrical portion 65c, second and third hub members 68, 69 are arranged sequentially from the front side, and on an inner peripheral surface of the cylindrical portion 65c of the common clutch drum 65 and on outer peripheral surfaces of cylindrical portions 68a, 69a of the second and third hub members 68, 69, a plurality of separator plates 72, 73 forming friction engagement portions 70, 71 of the second, third clutches C-2, C-3 and a plurality of friction plates 74, 75 are spline-engaged alternately. The second hub member 68 is bent in a radial direction on the rear side, and is fixed by welding or the like to a flange portion formed in a front end of a coupling shaft 77 in a cylindrical shape supported by a metal bearing 76 on the intermediate shaft 54. The coupling shaft 77 spline-engages at a rear end thereof with the third carrier C3 of the second multiple planetary gear set 16. The third hub member 69 is bent in a radial direction on the rear side, and is fixed by welding or the like to a radial direction extending portion of a coupling member 79. The coupling member 79 is supported at a cylindrical part extending rearward therefrom by a metal bearing 78 on an inner peripheral surface of a cylindrical portion extending on the front side of the first sun gear S1 of the first multiple planetary gear set 15, and spline-engages with an outer peripheral surface of a cylindrical portion extending on the front side of the second sun gear S2.

The first clutch C-1 is arranged inside the second and third clutches C-2, C-3. On an inner periphery of the second hub member 68, a first clutch drum 80 of the first clutch C-1 is arranged, and the first clutch drum 80 has a cylindrical portion 80a which extends forward, thereafter bends in a radial direction, and is fixed by welding or the like on the input shaft 14. On an inner periphery of the cylindrical portion 80a, a first hub member 81 is arranged, and on an inner peripheral surface of the cylindrical portion 80a and an outer peripheral surface of a cylindrical portion 81a of the first hub member 81, a plurality of separator plates 83 and a plurality of friction plates 84 forming a friction engagement portion 82 of the first clutch C-1 are spline-engaged alternately. The first hub member 81 is bent in a radial direction on the rear side, and spline-engaged with the intermediate shaft 54. A thrust bearing 85 is interposed between a frontmost end face of the first hub member 81 and a rear end face of the input shaft 14.

In the hydraulic servo unit 86 of the second clutch C-2, a piston 88 is engaged slidably with a cylinder 87 formed by a base end cylindrical portion projecting rearward from the base end portion 65a of the common clutch drum 65 and a bending portion inner peripheral surface of the bottom wall 65b, and a servo chamber 89 is partitioned in an oil-tight manner between the cylinder 87 and the piston 88. A cancel plate 90 is engaged with the base end cylindrical portion projecting rearward from the base end portion 65a and is restricted not to move backward by a snap ring. Between the cancel plate 90 and a rear face of the piston 88, a compression spring 91 biasing the separator plates 72 and the friction plates 74 in a non-coupling direction is interposed, and a cancel chamber 92 which cancels centrifugal oil pressure generated in the servo chamber 89 is provided. An abutting portion projecting rearward on the outside from the piston 88 faces the separator plate 72 on the front end of the second clutch C-2.

An oil passage 109 opening in the servo chamber 89 is bored in the base end portion 65a of the common clutch drum 65, and an oil passage 110 bored in an axis direction of the boss portion 43a of the front wall member 43 is communicated with the oil passage 109 via a distributor 111 interposed between an outer peripheral surface of the boss portion 43a and an outer peripheral surface of the base end portion 65a. The oil passage 110 is communicated with a discharging port of the oil pump 45 through an oil passage 112 bored in the boss portion 43a via a not-shown hydraulic servo valve. When oil pressure is supplied into the servo chamber 89 and the piston 88 is moved backward, the abutting portion of the piston 88 presses the separator plates 72 and brings the separator plates 72 and the friction plate 74 into pressure contact, thereby causing the second clutch C-2 to engage.

In the hydraulic servo unit 93 of the third clutch C-3, a piston 95 is engaged slidably with a front side portion outer peripheral surface of the base end portion 65a of the common clutch drum 65 and a bending portion outer peripheral surface of the bottom wall 65b, and a servo chamber 96 is partitioned in an oil-tight manner by the outer peripheral surface of the base end portion 65a, the bending portion outer peripheral surface of the bottom wall 65b, and the piston 95. A cancel plate 97 is engaged with the front end portion of the base end portion 65a by a snap ring and is restricted not to move forward. Between the cancel plate 97 and the piston 95, a compression spring 98 biasing the separator plates 73 and the friction plates 75 in a non-coupling direction is interposed, and a cancel chamber 99 which cancels centrifugal oil pressure generated in the servo chamber 96 is provided. An abutting member 108 faces the separator plate 73 on the rear end of the third clutch C-3, the abutting member 108 being engaged and restricted not to move backward by a snap ring with a rear end of an operating member 107 fixed by welding or the like on a rear end portion outer periphery of the piston 95 and extending rearward outside the cylindrical portion 65c of the common clutch drum 65.

An oil passage 113 opening in the servo chamber 96 is bored in the base end portion 65a of the common clutch drum 65, and an oil passage 114 bored in the axis direction of the boss portion 43a of the front wall member 43 is communicated with the oil passage 113 via the distributor 111. The oil passage 114 is communicated with the discharging port of the oil pump 45 through the oil passage 112 via the not-shown hydraulic servo valve. When oil pressure is supplied into the servo chamber 96 and the piston 95 is moved forward, the abutting member 108 coupled to the piston 95 presses the separator plates 73 and brings the separator plates 73 and the friction plate 75 into pressure contact, thereby causing the second clutch C-3 to engage.

In this manner, since the hydraulic servo units 86, 93 of the second and third clutches C-2, C-3 are provided respectively on a front face side and a rear face side of the bottom wall 65b in the common clutch drum 65, the hydraulic servo units 86, 93 of the second and third clutches C-2, C-3 can be arranged in a small space. Specifically, on the rear face side of the bottom wall 65b of the common clutch drum 65, the servo chamber 89 of the hydraulic servo unit 86 of the second clutch C-2 is partitioned by a rear side portion of the base end portion 65a of the common clutch drum 65 and the piston 88 slidably engaging with the inner peripheral surface of the bending portion of the bottom wall 65b of the clutch drum 65, and on the front face side of the bottom wall 65b of the common clutch drum 65, the servo chamber 96 of the hydraulic servo chamber 93 of the third clutch C-3 is partitioned by a front side portion of the base end portion 65a of the common clutch drum 65 and the piston 95 slidably engaging with the outer peripheral surface of the bending portion of the bottom wall 65b of the clutch drum 65. The oil passages 109, 113 opening in the servo chambers 89, 96 are provided in the base end portion 65a. Accordingly, the hydraulic servo units 86, 93 of the second and third clutches C-2, C-3 can be structured simply and compactly, and the oil passages supplying oil pressure to the servo chambers 89, 96 can be provided easily. Further, to communicate the oil passages 109, 113 opening in the servo chambers 89, 96 with the oil pump 45 via the not-shown servo-valves, the oil passages 110, 114 are provided in the boss portion 43a of the front wall member 43, and the oil passages 109, 113 and the oil passages 110, 114 are communicated by the distributor 111. Thus, the oil passages supplying/discharging oil pressure to/from the servo chambers 89, 96 of the second and third clutches C-2, C-3 can be provided easily.

In the hydraulic servo unit 100 of the first clutch C-1, a piston 102 is engaged slidably with the cylinder 101 formed by a bottom portion of the first clutch drum 80 and the outer peripheral surface of the input shaft 14, and a servo chamber 103 is formed in an oil-tight manner between the cylinder 101 and the piston 102. A cancel plate 104 is engaged with the rear end portion of the input shaft 14 and is restricted not to move in an axial direction by a snap ring. Between the cancel plate 104 and the piston 102, a compression spring 105 biasing the separator plates 83 and the friction plates 84 in a non-coupling direction is interposed, and a cancel chamber 106 which cancels centrifugal oil pressure generated in the servo chamber 103 is provided. An abutting portion projecting backward from the piston 102 faces the separator plate 83 on the frontmost end of the first clutch C-1.

An oil passage 115 opening in the servo chamber 103 is bored in the rear end portion of the input shaft 14, and an oil passage 116 bored in the axis direction of the boss portion 43a of the front wall member 43 is communicated with the oil passage 115 via a distributor 117 formed between the outer peripheral surface of the input shaft 14 and an inner peripheral surface of the boss portion 43a. The oil passage 116 is communicated with the discharging port of the oil pump 45 through the oil passage 112 via the not-shown hydraulic servo valve. When oil pressure is supplied into the servo chamber 103 and the piston 102 is moved backward, the abutting portion of the piston 102 presses the separator plates 83 and brings the separator plates 83 and the friction plate 84 into pressure contact, thereby causing the first clutch C-1 to engage.

The first multiple planetary gear set 15 is arranged on the common axis 13 on the rear side of the first clutch C-1, and the second sun gear S2 is supported rotatably by a metal bearing on the outer periphery of the coupling shaft 77 and spline-engages on a front end with a cylindrical portion inner peripheral surface of the coupling member 79. The first sun gear S1 is supported rotatably by a metal bearing across a cylindrical portion extending on the front side of the second sun gear S2 and the cylindrical portion of the coupling member 79. The common carrier C1C2 is supported rotatably by a metal bearing on a cylindrical portion extending on the front side of the first sun gear S1. On the common carrier C1C2, a pinion shaft 117 rotatably supporting the long pinion 18 meshing with the first sun gear S1, and a pinion shaft 118 rotatably supporting the pinion 19 meshing with the second sun gear S2 and the long pinion 18 are supported at both ends thereof. The common ring gear R1R2 meshing with the long pinion 18 is coupled directly to the third ring gear R3 of the second multiple planetary gear set 16. Specifically, on a cylindrical portion extending on the rear side of the common ring gear R1R2, a flange portion formed on the front side of the third ring gear R3 of the second multiple planetary gear set 16 is engaged and is restricted not to move backward by a snap ring, and a projection formed to project outward in a radial direction from the flange portion of the third ring gear R3 engages with an engagement groove formed in the cylindrical portion of the common ring gear R1R2, and is restricted not to rotate relatively.

The third brake B-3 is arranged on the outside of the cylindrical portion extending on the front side of the first sun gear S1. A common spline 119 is formed in the axis direction of an inner peripheral surface of a central portion in the axis direction of the transmission case body 12a, and with the common spline 119 and a spline formed in an outer peripheral surface of a hub member 120, a plurality of separator plates forming a friction engagement portion 121 of the third brake B-3 and a plurality of friction plates are spline-engaged alternately. A bending portion which is bent inward in a radial direction from a front end of the hub member 120 is fixed by welding or the like on a flange portion formed on a front end of the first sun gear S1. In a hydraulic servo portion 122 of the third brake B-3, a cylinder member 123 is spline-engaged with the common spline 119 and is restricted not to move forward by a snap ring 124, and a piston 126 is engaged slidably with the cylinder 125 formed in the cylinder member 123, and a servo chamber 127 is formed in an oil-tight manner between the cylinder 125 and the piston 126. An abutting portion projecting forward from the piston 126 faces the separate plate on the rearmost end of the third brake B-3. The piston 126 is biased in a direction to separate the separator plates and the friction plates by spring force of the compression spring 128. In the cylinder member 125, a port 129 supplying/discharging oil pressure into/from the servo chamber 127 is opened. When oil pressure is supplied into the servo chamber 127 and the piston 126 is moved forward, the abutting portion of the piston 126 presses the separator plates and brings the separator plates and the friction plates into pressure contact, thereby causing the third brake B-3 to engage. The cylinder member 123 is sandwiched between a step portion formed in a rear end portion of the common spline 119 and the snap ring 124 and is restricted not to move in the axis direction.

The first brake B-1 is arranged on the outside of the first multiple planetary gear set 15. With a spline formed on the rear side subsequent to the common spline 119 in the inner periphery of the transmission case body 20a and with a spline formed in an outer peripheral surface of a hub member 130, a plurality of separator plates and a plurality of friction plates forming a friction engagement portion 131 of the first brake B-1 are spline-engaged alternately. A bending portion extending on the front side of the hub member 130 and bending in a radial direction is fixed on the common carrier C1C2 by bolts 132. In a hydraulic servo portion 133 of the first brake B-1, a cylinder member 134 is engaged with a stepped hole formed in the transmission case body 12a, a piston 136 is slidably engaged with the cylinder 135 formed in the cylinder member 134, and a servo chamber 137 is formed in an oil-tight manner between the cylinder 135 and the piston 136. An abutting portion projecting forward from the piston 136 faces the separator plate on the rearmost end of the first brake B-1. The piston 136 is biased in a direction to separate the separator plates and the friction plates by spring force of a compression spring 138. In the cylinder member 134, a port 139 supplying/discharging oil pressure to the servo chamber 137 is opened.

When oil pressure is supplied into the servo chamber 137 and the piston is moved forward, the abutting portion of the piston 136 presses the separator plates and brings the separator plates and the friction plates into pressure contact, thereby causing the first brake B-1 to engage.

The second multiple planetary gear set 16 is arranged on the common axis on the rear side of the first multiple planetary gear set 15. The third sun gear S3 of the second multiple planetary gear set 16 is engaged with and fitted on the intermediate shaft 54, the third carrier C3 is spline-engaged with a spline formed in the outer periphery of the rear end portion of the coupling shaft 77 of the third carrier C3 and is supported rotatably by a cylindrical portion extending on the front side of the coupling member 140 supported rotatably on the intermediate shaft 54 by a needle bearing. On the third carrier C3, a pinion shaft 141 rotatably supporting the third pinion 20 meshing with the third sun gear S3 and third ring gear R3 is supported at both ends. A support body 142 is spline-engaged on a flange portion inner peripheral surface of the third ring gear R3, and the support body 142 is supported rotatably by a metal bearing on a cylindrical portion formed to project on the front side of the third carrier C3.

An inner lace 146 of the one-way clutch F-1 is spline-engaged with an outer periphery of the coupling member 140, and an outer lace 147 of the one-way clutch F-1 is engaged with a stepped hole formed in the rear side of the transmission case body 12a so as not to rotate, and is restricted not to move in the axis direction by a snap ring 148 and a step portion of the stepped hole.

The fourth sun gear S4 of the second multiple planetary gear set 16 is formed in the intermediate shaft 54, and the fourth carrier C4 is coupled to the flange portion formed on a tip of the output shaft 17. A pinion shaft 149 rotatably supporting the fourth pinion 21 meshing with the fourth sun gear S4 and the fourth ring gear R4 is supported at both ends on the fourth carrier C4. The fourth ring gear R4 spline-engages at a front side cylindrical portion with a support portion, extending from the rear end of the coupling member 140 on the outside in a radial direction, to be supported thereby, and is restricted not to move backward by a snap ring.

The second brake B-2 is arranged outside the third ring gear R3. A plurality of separator plates and a plurality of friction plates forming a friction engagement portion 150 of the second brake B-2 are spline-engaged alternately with a spline formed in the inner peripheral surface of the transmission case body 12a and a spline formed in an outer peripheral surface of the third ring gear R3. In a hydraulic serve unit 151 of the second brake B-2, a cylinder member 152 abuts on the outer lace 147 and is restricted not to move backward and engaged with the inner peripheral surface of the spline formed in the transmission case body 12a so as not to rotate, a piston 154 is slidably engaged with a cylinder 153 formed in the cylinder member 152, and a servo chamber 155 is formed in an oil-tight manner between the cylinder 153 and the piston 154. The piston 154 faces the separator plate on the rearmost end of the second brake B-2 via a spring seat 156 abutting on a front end thereof. The piston 154 is biased in a direction to separate the separator plates and the friction plates by spring force of a compression spring 157 operating on the spring seat 156. In the cylinder member 152, a port 166 supplying/discharging oil pressure into/from the servo chamber 155 is opened. When oil pressure is supplied into the servo chamber 155 and the piston 154 is moved forward, the piston 154 presses the separator plate on the frontmost end via the spring seat 156 and brings the separator plates and the friction plates into pressure contact, thereby causing the second brake B-2 to engage.

The fourth brake B-4 is arranged outside the ring gear R4. A plurality of separator plates and a plurality of friction plates forming a friction engagement portion 158 of the fourth brake B-4 are spline-engaged alternately with a spline formed in a rear end portion inner peripheral surface of the transmission case body 12a and a spline formed in an outer peripheral surface of the fourth ring gear R4. In a hydraulic servo portion 159 of the fourth brake B-4, a piston 161 is engaged slidably with a cylinder 160 formed on the bottom wall 12b of the transmission case body 12a, and a servo chamber 162 is formed in an oil-tight manner between the cylinder 160 and the piston 161. The piston 161 faces the separator plate on the rearmost end of the fourth brake B-4 via a press member 163 abutting on the front end thereof. The piston 161 is biased in a direction to separate the separator plates and the friction plates by spring force of a compression spring 164. An oil passage 165 supplying/discharging oil pressure into/from the servo chamber 162 is opened in the bottom wall 12b. When oil pressure is supplied into the servo chamber 162 and the piston 161 is moved forward, the piston 161 presses the separator plate on the rearmost end via the press member 163 and brings the separator plates and the friction plates into pressure contact, thereby causing the fourth brake B-4 to engage.

Figure 8:
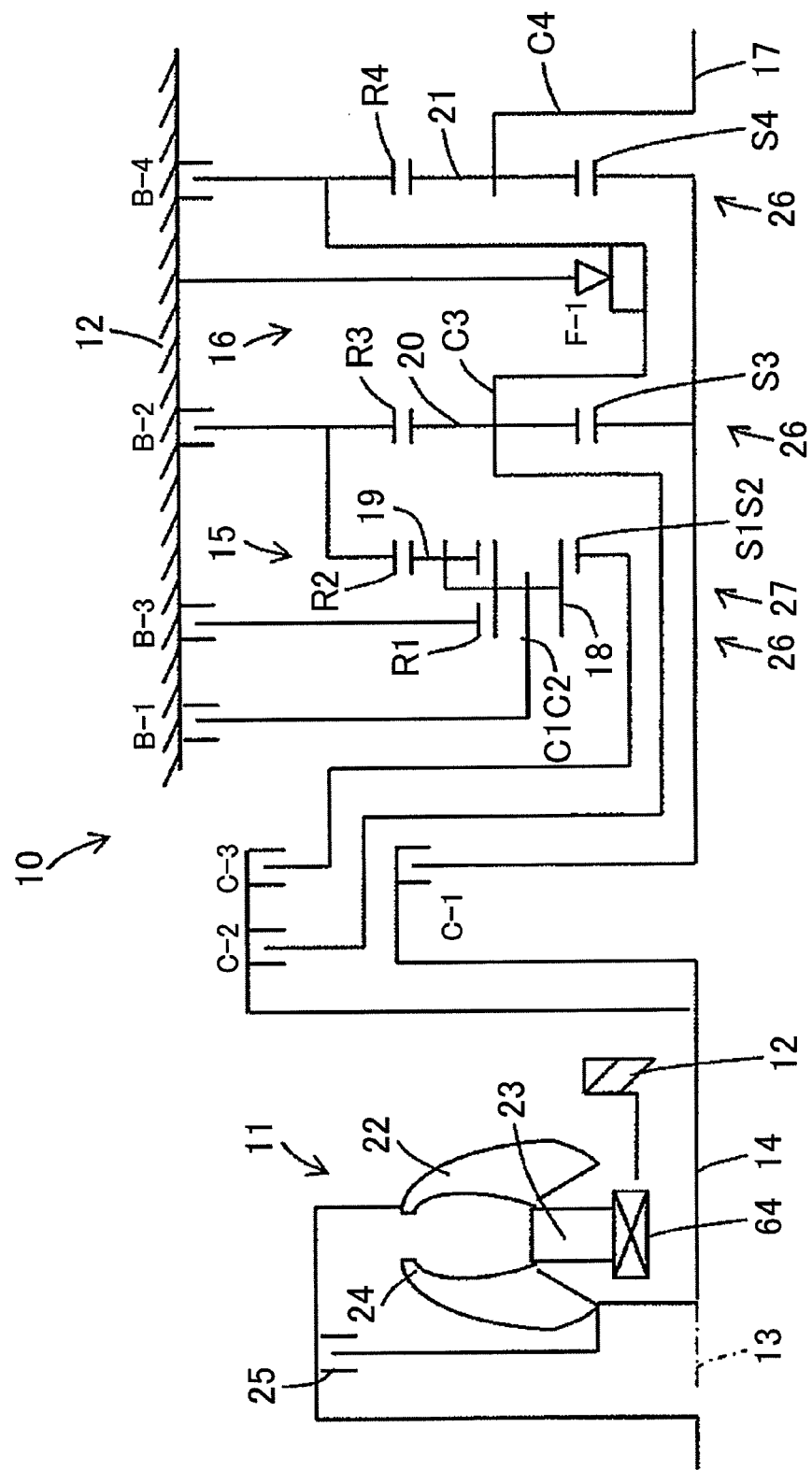
FIG. 8 is a skeleton diagram showing a second embodiment.

Next, a second non-limiting embodiment will be explained. The second embodiment is different from the first embodiment in the first multiple planetary gear set 15. Thus, this difference will be explained, and other parts are omitted from the explanation, with the same elements being given the same reference numbers. As shown in FIG. 8, the first multiple planetary gear set 15 in the second embodiment is structured including a common sun gear S1S2 supported rotatably on the common axis 13, a long pinion 18 meshing with the common sun gear S1S2, a first ring gear R1 meshing directly with the long pinion 18, and a second ring gear R2 meshing with the long pinion 18 via a pinion 19. The common sun gear S1S2 of the first multiple planetary gear set 15 can be coupled to the input shaft 14 via the third clutch C-3, the second ring gear R2 is coupled directly to the third ring gear R3 of the second multiple planetary gear set 16, the common carrier C1C2 can be fixed via the first brake B-1, and the first ring gear R1 can be fixed via the third brake B-3. Engagement states of the first to third clutches C-1 to C-3, the first to fourth brakes B-1 to B-4 and the one-way clutch F-1 in the respective shift speeds are the same as in the case of the first embodiment of FIG. 2.

With the respective gear ratios λ1, λ2, λ3, λ4 of the single-pinion planetary gear 26 and the double-pinion planetary gear 27 of the first and second multiple planetary gear sets 15, 16 being set to 0.458, 0.440, 0.394, 0.394 for example, the gear ratios with the respective shift speeds become appropriate values, 3.538 for the first speed, 2.060 for the second speed, 1.405 for the third speed, 1.246 for the fourth speed, 1.000 for the fifth speed, 0.784 for the sixth speed, 0.713 for the seventh speed, 0.582 for the eighth speed, 3.168 for the first reverse speed, 2.263 for the second reverse speed. Then, the steps between the respective gear ratios are 1.717 between the first, second speeds, 1.467 between the second, third speeds, 1.127 between the third, fourth speeds, 1.246 between the fourth, fifth speeds, 1.275 between the fifth, sixth speeds, 1.099 between the sixth, seventh speeds, 1.225 between the seventh, eighth speeds, and the gear ratios decrease with appropriate ratios in the respective shift speeds. With the automatic transmission according to this embodiment, the gear ratios of eight forward speeds and two reverse speeds which are separated appropriately can be obtained.

Figure 9:
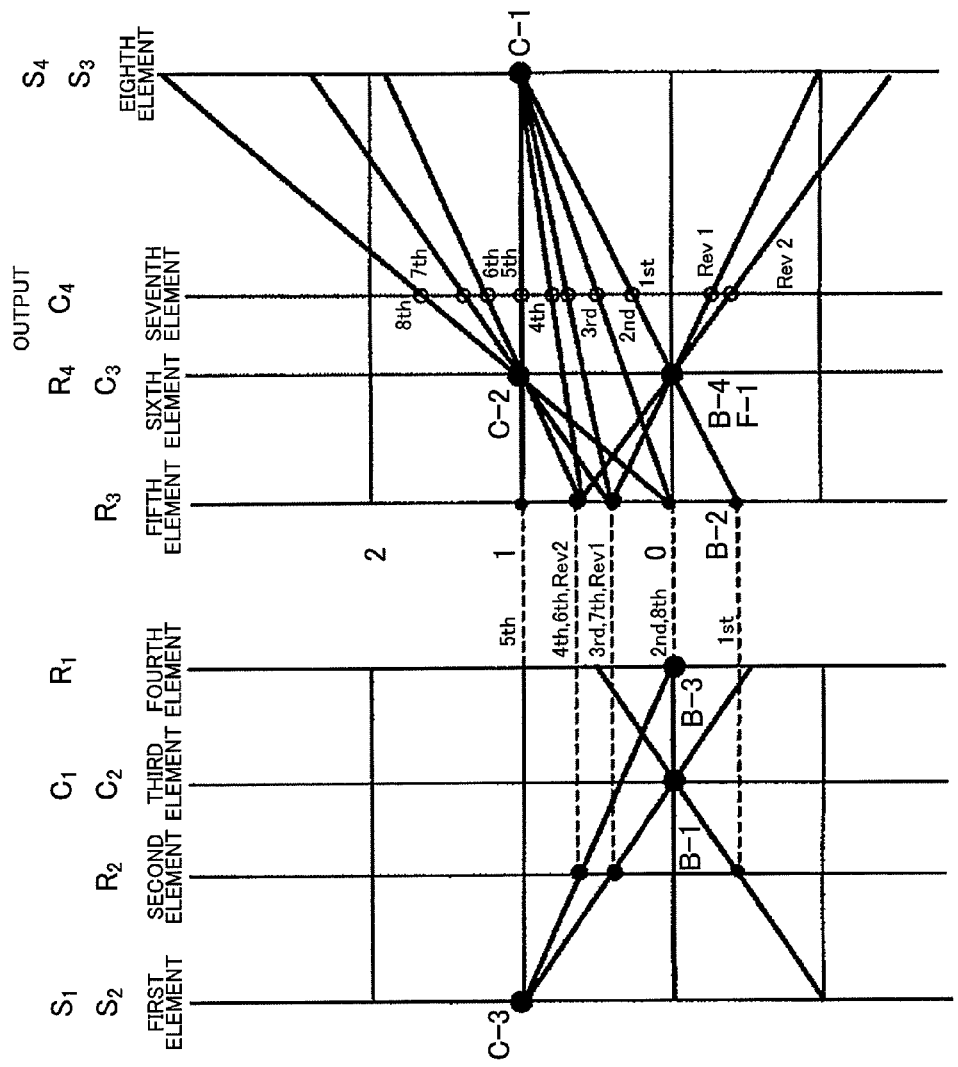
FIG. 9 is a speed diagram showing rotation ratios of respective elements of planetary gear sets with respective shift speeds of the second embodiment.

In the second embodiment, as shown in FIG. 9, on the speed diagram of the first multiple planetary gear set 15, elements corresponding to the four respective vertical lines are first, second, third, fourth elements in the order of arrangement from the left side of the vertical lines, and on the speed diagram of the second multiple planetary gear set 16, elements corresponding to the four respective vertical lines are fifth, sixth, seventh, eighth elements in the order of arrangement from the left side of the vertical lines. In the case of the second embodiment, the common sun gear S1S2 of the first multiple planetary gear set 15 is the first element, the second ring gear R2 is the second element, the common carrier C1C2 is the third element, the first ring gear R1 is the fourth element. The third ring gear R3 of the second multiple planetary gear set 16 is the fifth element, the third carrier C3 and the fourth ring gear R4 are the sixth element, the fourth carrier C4 is the seventh element, and the third and fourth sun gears S3, S4 are the eighth element.

Figure 4:
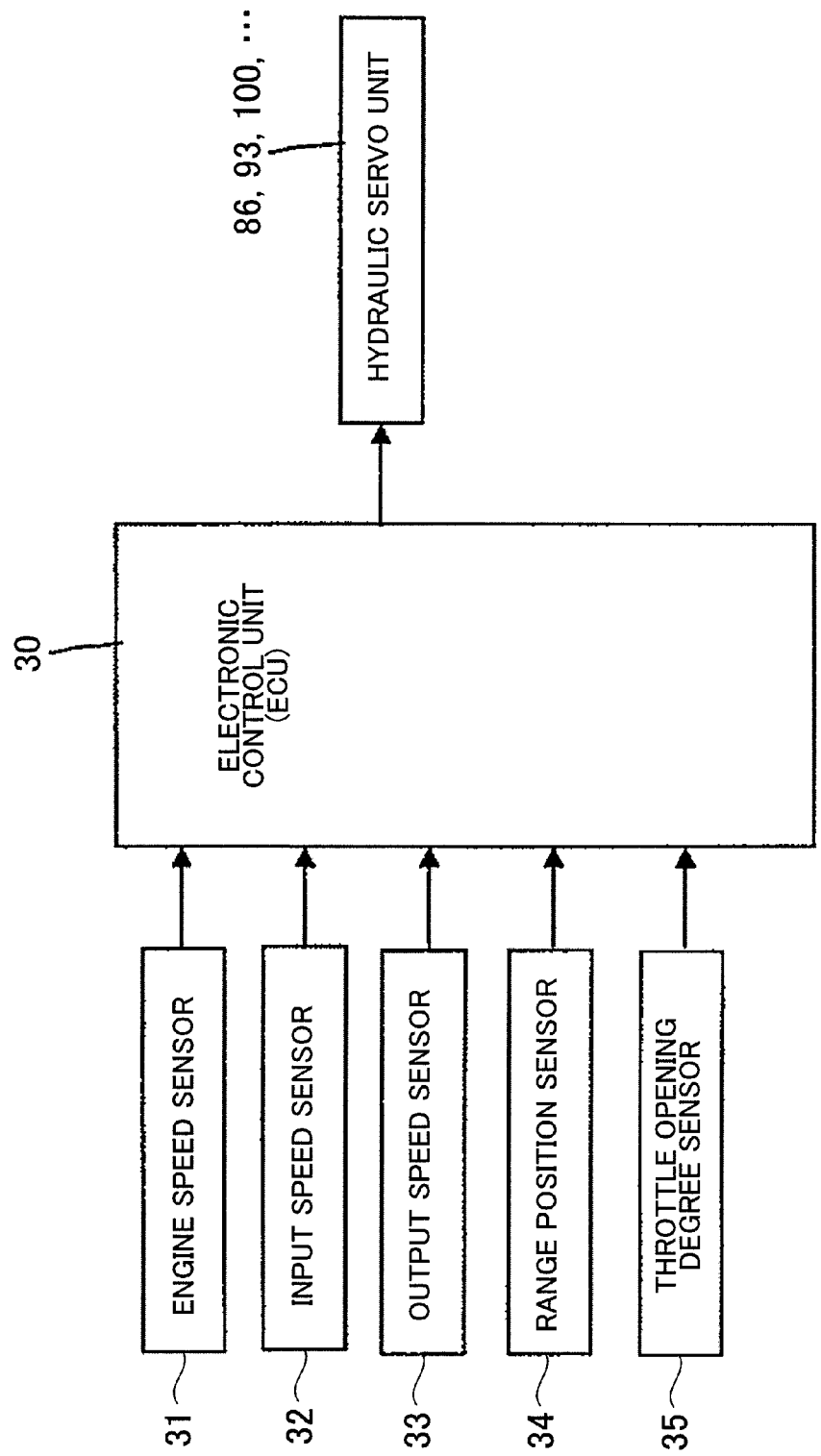
FIG. 4 is a block diagram showing a control unit.

In the second embodiment, the third brake B-3 is made to function as the first brake B-1, and the first brake B-1 is made to function as the third brake B-3 in FIG. 4 showing the specific structure of the first embodiment. Then a bending portion bent inward in a radial direction from a front end of the hub member 120 constituting the first brake B-1 (hub member 120 constituting the third brake B-3 in the first embodiment) is fixed to the common carrier C1C2 by bolts. A bending portion bending in a radial direction of the hub member 130 of the third brake B-1 (hub member 120 constituting the first brake B-1 in the first embodiment) arranged outside the first ring gear R1 is fixed to the front end of the first ring gear R1 by welding or the like.

Figure 10:
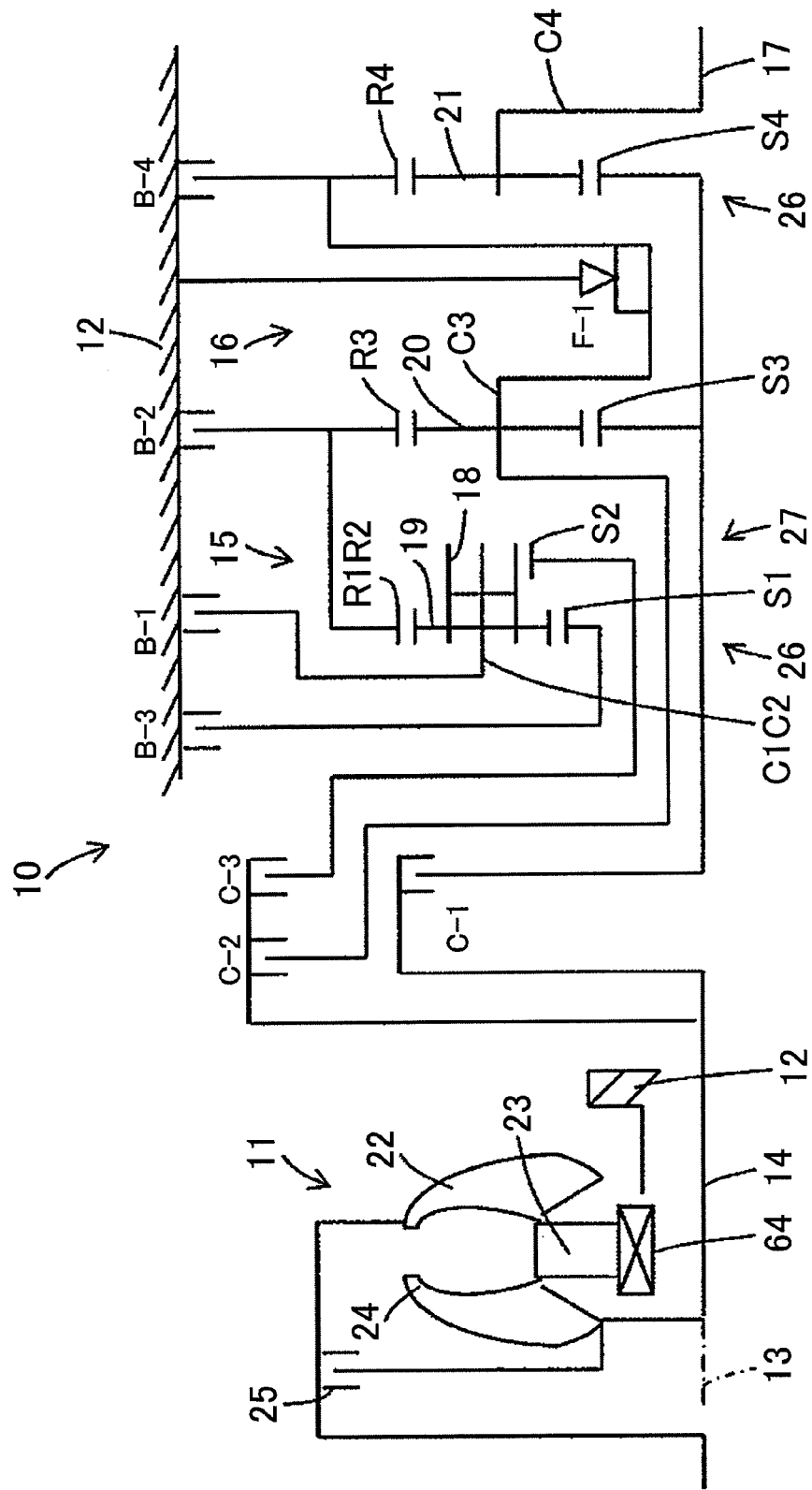
FIG. 10 is a skeleton diagram showing a third embodiment.

Next, a third non-limiting embodiment will be explained. The third embodiment is different from the first embodiment in the first multiple planetary gear set 15. Thus, this difference will be explained, and other parts are omitted from the explanation, with the same elements being given the same reference numbers. As shown in FIG. 10, the first multiple planetary gear set 15 in the third embodiment is structured including first, second sun gears S1, S2 supported rotatably on the common axis 13, a long pinion 18 meshing with the second sun gear S2, and a common ring gear R1R2 meshing with the long pinion 18 via a pinion 19. The second sun gear S2 of the first multiple planetary gear set 15 can be coupled to the input shaft 14 via the third clutch C-3, the common ring gear R1R2 is coupled directly to the third ring gear R3 of the second multiple planetary gear set 16, the common carrier C1C2 can be fixed via the first brake B-1, and the first sun gear S1 can be fixed via the third brake B-3. Engagement states of the first to third clutches C-1 to C-3, the first to fourth clutches C-1 to C-4 and the one-way clutch F-1 in the respective shift speeds are the same as in the case of the first embodiment of FIG. 2.

With the respective gear ratios λ1, λ2, λ3, λ4 of the single-pinion planetary gear 26 and the double-pinion planetary gear 27 of the first and second multiple planetary gear sets 15, 16 being set to 0.440, 0.480, 0.394, 0.394 for example, the gear ratios with the respective shift speeds become appropriate values, 3.538 for the first speed, 2.060 for the second speed, 1.365 for the third speed, 1.147 for the fourth speed, 1.000 for the fifth speed, 0.849 for the sixth speed, 0.728 for the seventh speed, 0.582 for the eighth speed, 2.904 for the first reverse speed, 1.855 for the second reverse speed. Then, the steps between the respective gear ratios are 1.717 between the first, second speeds, 1.509 between the second, third speeds, 1.191 between the third, fourth speeds, 1.147 between the fourth, fifth speeds, 1.178 between the fifth, sixth speeds, 1.165 between the sixth, seventh speeds, 1.251 between the seventh, eighth speeds, and the gear ratios decrease with appropriate ratios in the respective shift speeds. With the automatic transmission according to this embodiment, the gear ratios of eight forward speeds and two reverse speeds which are separated appropriately can be obtained.

Figure 11:
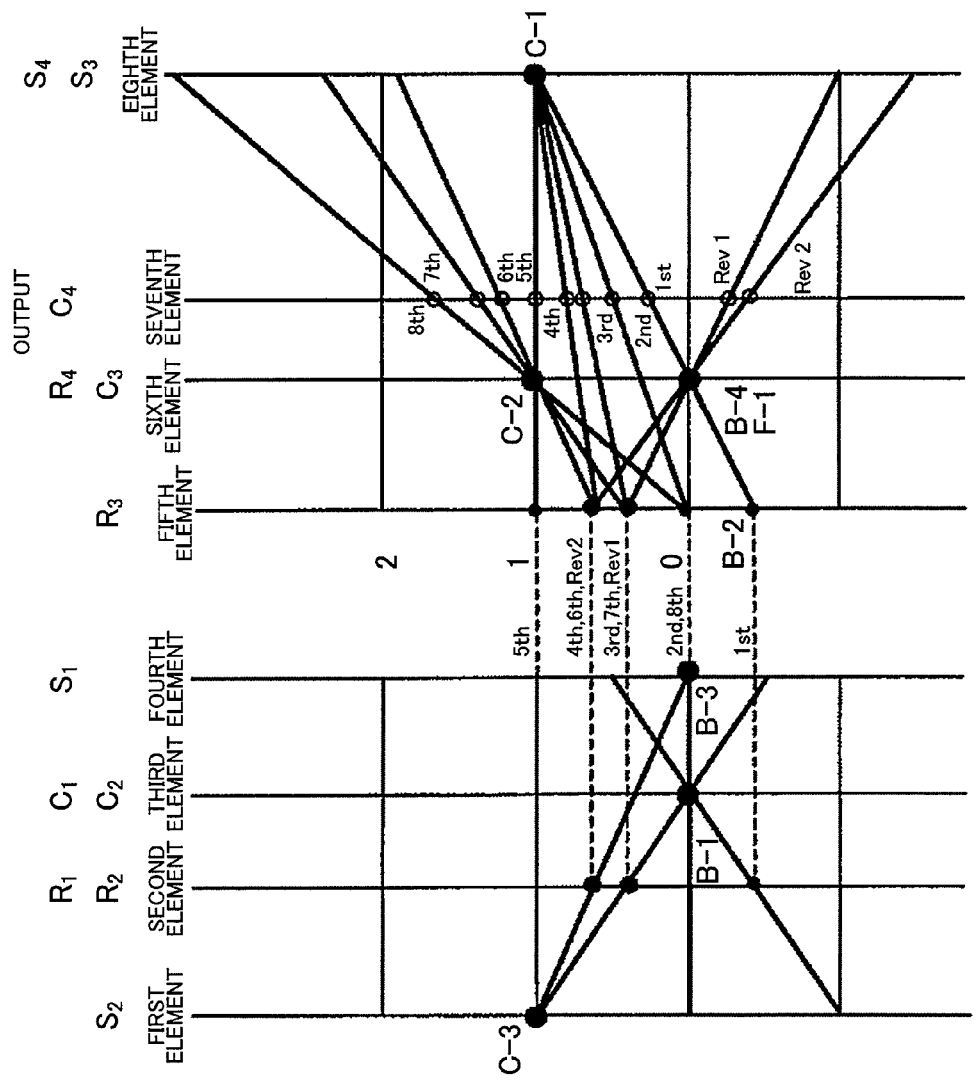
FIG. 11 is a speed diagram showing rotation ratios of respective elements of planetary gear sets with respective shift speeds of the third embodiment.

In the third embodiment, as shown in FIG. 11, on the speed diagram of the first multiple planetary gear set 15, elements corresponding to the four respective vertical lines are first, second, third, fourth elements in the order of arrangement from the left side of the vertical lines, and on the speed diagram of the second multiple planetary gear set 16, elements corresponding to the four respective vertical lines are fifth, sixth, seventh, eighth elements in the order of arrangement from the left side of the vertical lines. In the case of the second embodiment, the second sun gear S2 of the first multiple planetary gear set 15 is the first element, the common ring gear R1R2 is the second element, the common carrier C1C2 is the third element, the first sun gear S1 is the fourth element. The third ring gear R3 of the second multiple planetary gear set 16 is the fifth element, the third carrier C3 and the fourth ring gear R4 are the sixth element, the fourth carrier C4 is the seventh element, and the third and fourth sun gears S3, S4 are the eighth element.

An automatic transmission is disclosed in Japanese Patent Application Publication No. JP-A-2001-263438, which has first to third clutches provided together on the front side of the automatic transmission, a single double-pinion planetary gear, and a multiple planetary gear set constituted of two single-pinion planetary gears arranged in an axial direction in this order, and is structured including first to fourth brakes selectively fixing respective elements of the single double-pinion planetary gear and the multiple planetary gear set, in which the first to third clutches, and the first to fourth brakes are engaged selectively to thereby realize six forward speeds and one reverse speed.

The automatic transmission 10 according to the first and second embodiments can change, in the currently implemented automatic transmission described in Japanese Patent Application Publication No. JP-A-2001-263438, the six forward speeds to eight forward speeds just by replacing the single double-pinion planetary gear with the multiple planetary gear set of Ravigneaux type, and the other components of the automatic transmission of the eight forward speeds and the two reverse speeds according to this embodiment can be used in common with the components of the automatic transmission being implemented.

The automatic transmission 10 according to the second embodiments can change, in the automatic transmission described in Japanese Patent Application Publication No. JP-A-2001-263438, the six forward speeds to eight forward speeds just by replacing the single double-pinion planetary gear with the multiple planetary gear set of Ravigneaux type, making the third brake function as the first brake, and making the first brake function as the third brake, and the other components of the automatic transmission of the eight forward speeds and the two reverse speeds according to the second embodiment can be used in common with the components of the automatic transmission being implemented.

The automatic transmission according to the present invention is suitable for use as an automatic transmission that changes rotation of an engine of an automobile with a plurality of speeds and outputs the rotation by engaging and disengaging a plurality of friction engagement elements constituted of clutches and brakes.

The invention claimed is:

1. An automatic transmission comprising:
an input shaft, an output shaft, a first multiple planetary gear set having first, second, third and fourth elements, and a second multiple planetary gear set having fifth, sixth, seventh and eighth elements, wherein
the first element is a common sun gear which is coupled to the input shaft via a third clutch and meshes with first and second ring gears via a long pinion and a pinion supported rotatably by a common carrier and meshing with each other,
the second element is a second ring gear coupled directly to the fifth element and meshing with the pinion,
the third element is the common carrier which is fixed via a first brake,
the fourth element is a first ring gear which is fixed via a third brake and meshes with the long pinion,
the fifth element is fixed via a second brake,
the sixth element is coupled to the input shaft via a second clutch and is fixed via a fourth brake,
the seventh element is coupled directly to the output shaft,
the eighth element is coupled to the input shaft via a first clutch, and
the first to third clutches, the first multiple planetary gear set, and the second multiple planetary gear set are arranged in an order of the first to third clutches, the first multiple planetary gear set, the second multiple planetary gear set in an axial direction, and the first brake is arranged on a side of the first to third clutches.

2. The automatic transmission according to claim 1, wherein a clutch drum for the second clutch and the third clutch is a common clutch drum structured to be used in common.

3. The automatic transmission according to claim 2, wherein the first clutch is arranged inside the second and third clutches.

4. The automatic transmission according to claim 3, wherein hydraulic servo units of the second and third clutches are provided in the common clutch drum on a rear face side and a front face side of a bottom wall of the common clutch drum respectively.

5. The automatic transmission according to claim 4, wherein a servo chamber of the hydraulic servo unit of the second clutch is partitioned on the rear face side of the bottom wall of the common clutch drum by a rear side portion of a base end portion of the common clutch drum and a piston engaging slidably with an inner peripheral surface of a bending portion of the bottom wall, a servo chamber of the hydraulic servo unit of the third clutch is partitioned on the front face side of the bottom wall by a front side portion of the base end portion and a piston engaging slidably with an outer peripheral surface of the bending portion, and oil passages opening in the servo chambers are provided in the base end portion.

6. The automatic transmission according to claim 5, wherein the base end portion of the common clutch drum is supported rotatably by a boss portion provided to project on a rear side of a front wall member fixed to a front end face of the transmission case, and the oil passages opening in the respective servo chambers are communicated respectively with oil passages provided in the boss portion via a distributor.

7. The automatic transmission according to claim 1, wherein in the second multiple planetary gear set,
the fifth element is a third ring gear,
the sixth element is a third carrier supporting a third pinion and a fourth ring gear coupled directly to the third carrier,
the seventh element is a fourth carrier supporting a fourth pinion, and
the eighth element is a third sun gear meshing with the third ring gear via the third pinion and a fourth sun gear coupled directly to the third sun gear and meshing with the fourth ring gear via the fourth pinion.

8. The automatic transmission according to claim 2, wherein hydraulic servo units of the second and third clutches are provided in the common clutch drum on a rear face side and a front face side of a bottom wall of the common clutch drum respectively.

9. The automatic transmission according to claim 8, wherein a servo chamber of the hydraulic servo unit of the second clutch is partitioned on the rear face side of the bottom wall of the common clutch drum by a rear side portion of a base end portion of the common clutch drum and a piston engaging slidably with an inner peripheral surface of a bending portion of the bottom wall, a servo chamber of the hydraulic servo unit of the third clutch is partitioned on the front face side of the bottom wall by a front side portion of the base end portion and a piston engaging slidably with an outer peripheral surface of the bending portion, and oil passages opening in the servo chambers are provided in the base end portion.

10. The automatic transmission according to claim 9, wherein the base end portion of the common clutch drum is supported rotatably by a boss portion provided to project on a rear side of a front wall member fixed to a front end face of the transmission case, and the oil passages opening in the respective servo chambers are communicated respectively with oil passages provided in the boss portion via a distributor.

* * * * *